United States Patent [19]
Dalton

[11] 3,754,508
[45] Aug. 28, 1973

[54] SENSOR EMPLOYING A RESISTANCE VARIATION DETECTING SYSTEM

[75] Inventor: Michael S. Dalton, Richmond, Ind.

[73] Assignee: Avco Corporation, Richmond, Ind.

[22] Filed: Apr. 5, 1971

[21] Appl. No.: 131,219

[52] U.S. Cl................. 102/70.2 R, 102/19.2, 102/8
[51] Int. Cl...... F42b 73/00, F42c 7/02, F42c 11/00
[58] Field of Search.................. 102/70.2 G, 70.2 A, 102/8, 19.2

[56] References Cited
UNITED STATES PATENTS
3,304,864  2/1967  Thomanek........................ 102/19.2
3,384,017  5/1968  Lazarus et al. ........................ 102/8

FOREIGN PATENTS OR APPLICATIONS
977,512  9/1966  Germany................................ 102/8

*Primary Examiner*—Benjamin A. Borchelt
*Assistant Examiner*—Thomas H. Webb
*Attorney*—Charles M. Hogan and Eugene C. Goodale

[57] ABSTRACT

A sensor employing a resistance variation detecting system for detecting rapid changes in the resistance between two or more electrodes placed upon the surface of the earth is disclosed. Ground engaging sense electrodes establish an initial condition having an ohmic resistance relative to the ground. The value of this ohmic resistance changes when the sense electrodes are moved to make better contact with the surface of the earth. Means are provided to detect the rapid change in the ohmic resistance and enable suitable utilization means.

22 Claims, 5 Drawing Figures

PATENTED AUG 28 1973  3,754,508

INVENTOR
MICHAEL S. DALTON

BY Charles M. Hogan
Eugene C. Goodale
ATTORNEYS.

INVENTOR
MICHAEL S. DALTON

BY Charles M. Hogan
Eugene C. Goodale
ATTORNEYS.

SENSOR EMPLOYING A RESISTANCE VARIATION DETECTING SYSTEM

BACKGROUND OF THE INVENTION

This invention relates generally to intrusion alarms and mine firing systems employing resistance detecting systems and more particularly to ground resistance variation detecting systems for detecting rapid changes in ground resistance of sense electrodes.

There are numerous types of alarm and mine firing systems in use now. Many of these systems are actuated by the weight of the person or vehicle passing over some means such as a treadle or pad. The weight of the body on the treadle or pad activates an alarm, detonator or the like through mechanical, electrical or pneumatic means. Many such systems are complex in nature, and have only limited utility. Quite often, elaborate and costly installations are necessary in order to install and make the detecting system operational.

Accordingly, it is an object of this invention to provide a sensor for use in detecting the presence of personnel or vehicles based on a ground resistance variation detection system.

A further object of this invention is to provide a ground resistance detecting system to determine variations from an initial set up condition irrespective of the different values of local ground resistance.

Another object of this invention is to provide a ground resistance variation detecting system having means to detect a change in the resistance of sense electrodes placed upon the surface of the earth resulting from the presence of personnel or vehicles.

Yet another object of this invention is to provide a self-contained detecting system for use either in an alarm system or in a mine firing system.

SUMMARY OF THE INVENTION

This invention provides a sensor to detect the presence of personnel and vehicles. Sense electrodes are placed along the surface of the earth to make random contacts therewith and thereby establishing an initial ohmic resistance to ground. Detecting means are connected with the electrodes to detect rapid changes in the ohmic electrode to ground resistance when the electrodes are urged into closer contact with the earth. The ground resistance variation detecting system automatically compensates for local variations in the magnitude of the ground resistance. The detecting means provides an output signal in response to the change in ohmic resistance of the electrodes. The output signal is used to enable any suitable utilization means.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which.

DESCRIPTION OF THE ILLUSTRATED EMBODIMENT

Figure 1:
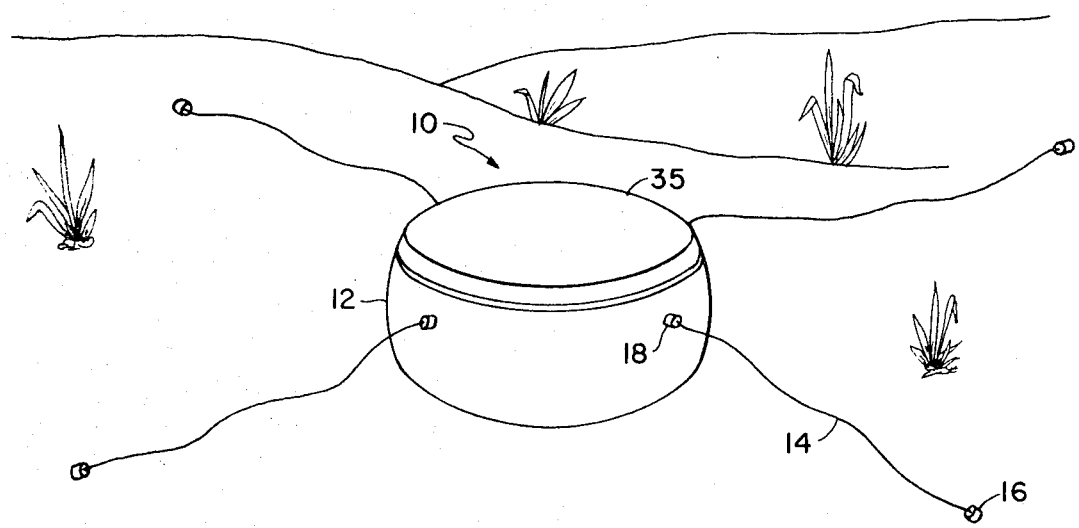
FIG. 1 is a perspective view illustrating one exemplary embodiment of this invention showing the sensor used in a mine environment.

Reference is now made to FIG. 1 of the drawings, which illustrates one exemplary embodiment of the sensor resulting from this invention, which is designated generally by the reference numeral 10. For illustrative purposes only, the sensor system 10 will be described for use in a mine environment. The sensor system 10 is comprised of a casing or housing 12 having a plurality of sense electrodes 14 extending therefrom. The sense electrodes 14 extend into the interior of the housing 12 and are electrically connected with the resistance variation measurement circuit 22 to be described herebelow. Short lengths of insulating material 18 insulate electrodes 14 from the housing 12. A suitable weight 16 is attached to the outer end of each sense electrode 14.

The housing 12 is constructed from a conducting material and forms a ground engaging base electrode for the sensor system 10. The sense electrodes 14 are formed of a conducting material such as wire. The wires 14, by way of example, are oriented in a radial pattern in the illustrated embodiment shown. The wires 14 extend along and randomly engage the surface of the earth and are held in position by the weights 16 on the end of the wires.

A resistive impedance or ohmic resistance to ground exists when the wires 14 have been laid on the ground or adjacent thereto, i.e., randomly touching the ground and being supported by grass, stones, etc. The initial value of the resistive impedance in wire 14 or ground resistance will decrease considerably in response to an external influence urging the wire into better or closer contact with the ground, such as by a man stepping on a wire sense electrode 14.

Figure 2:
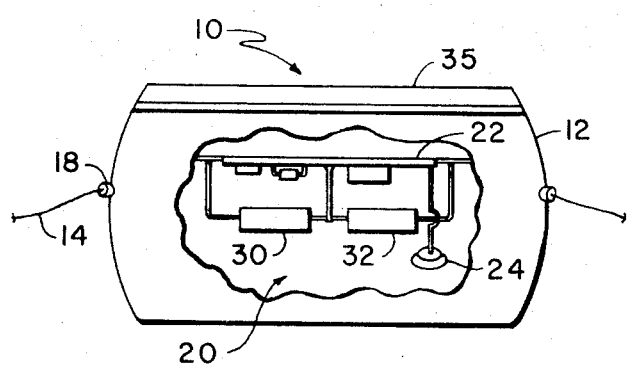
FIG. 2 is an elevation view of the housing of FIG. 1 partially cut away to show the internally mounted electronic circuit board.

In order to make a usable mine or an alarm signal, a suitable power supply and associated circuitry are needed to utilize the variations in the ground resistance. Referring to FIG. 2, it is seen that the housing 12 houses an explosive 20. Internal to the mine is the resistance variation measurement circuit designated generally as 22 including the batteries 30 and 32 and the detonator 24.

Figure 3:
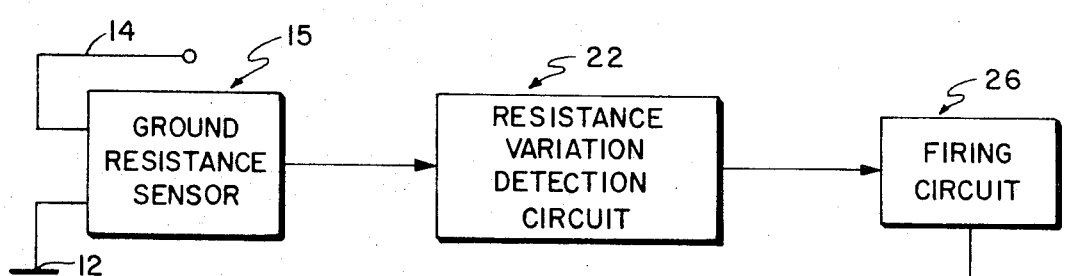
FIG. 3 is a block diagram of one embodiment of the resistance variation detecting system of this invention.

A block diagram of the electronic circuitry embodied in the resistance variation detecting system 10 is presented in FIG. 3. It is seen that the ground resistance sensor 15, comprising the housing 12 and sense electrodes 14, provides the input to the resistance variation measurement circuit 22. The circuit 22 provides a control output signal which is used to control the firing circuit 26 in a conventional manner. The firing circuit 26 enables any suitable utilization means, such as a detonator 24 in the illustrated embodiment. The resistance variation measurement circuit 22 can be an AC coupled amplifier which has both very low and high frequency roll-off. It may also be constructed from a self-balancing bridge circuit. One particular circuit that has been developed and used is the circuit shown in FIG. 4 in which a DC amplifier has been used.

A common technique in measuring resistance is to measure the current through a meter either directly or in a nulling circuit with a battery as a source of electrical energy. Another technique is to measure the voltage across a resistor with a constant current source. Rather than measuring the resistance to the ground directly, a measurement of either voltage or current may be made.

Figure 4:
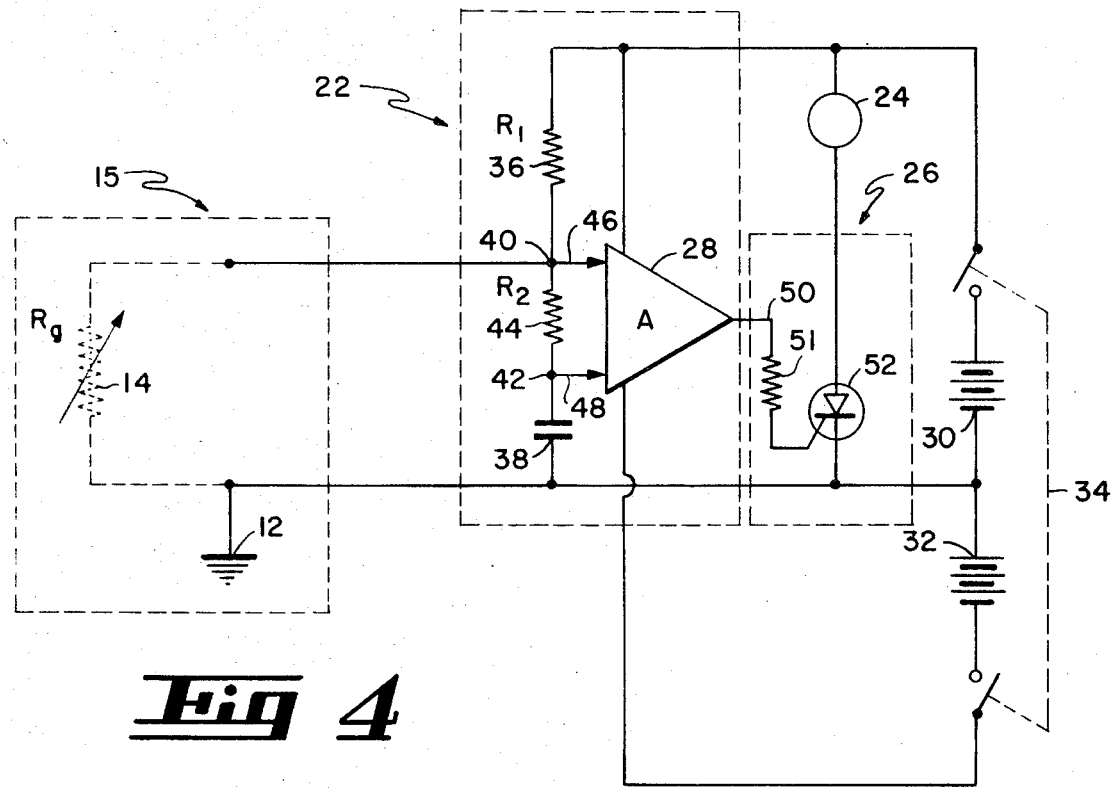
FIG. 4 is an exemplary schematic of a suitable electronic circuit utilized in this invention.

A circuit for providing a control output signal in response to the ground resistance sensor 15 is shown in FIG. 4. This circuit may use any suitable active or passive element, such as a single direct coupled operational amplifier to function as an amplifier and comparison circuit. The amplifier 28 is a conventional operational amplifier (OP-AMP) used as a difference amplifier with open loop. Operational amplifiers are commercially available from a number of manufacturers listed in the directory of OP-AMP manufacturers in the April 1969 EEE magazine, "Designers Guide: Operational Amplifiers," page 58. A general description of operational amplifiers used as difference amplifiers is described at page 64 of the "Designers Guide." The amplifier used in the present invention is described in the Fairchild Application Brief 123, June 1969, entitled, "A Micropower Monolithic Operational Amplifier."

The circuit 22 processes information from the ground resistance sensor 15 by comparing the present effect of the ground resistance to the initial ground resistance. If the latest value of ground resistance from the sensor 15 decreases by a sufficient amount over a relatively short interval of time, the difference amplifier 28 (FIG. 4) will cause a change in the logical output. I this case, the circuit provides an output control signal change from approximately $-2$ volts to $+2$ volts.

Referring to FIG. 4, the circuit 22 is powered by batteries 30 and 32. Assume that the battery switch 34 has been open. Suitable means are provided to effect the closing of the initially open switch 34. The switch 34 may also be closed by a safe and arming device. As an example, cover 35 of housing 12 may be removed to expose the switch 34. As the switch 34 is closed, the amplifier 28 is powered and bias currents for the amplifier 28 and the ground resistance sensor 15 are provided by the positive battery 30 through resistor 36 ($R_1$). Initially, there is no charge on the plates of capacitor 38; hence, the voltage across the capacitor is zero. The voltage across the capacitor 38 cannot rise instantaneously after the battery switch 34 is closed. The voltage at point 40, however, rises instantaneously to a voltage determined by the values of resistors $R_1$, $R_2$, and $R_g$, respectively 36, 44 and 14, and the positive battery 30 voltage. This difference voltage is applied essentially to the inverting input 46 of the amplifier 28. The voltage at the input terminals 46 and 48 causes the amplifier 28 output control signal 50 to assume a value below the (reference) ground level.

As time passes, the voltage across resistor 44 decreases exponentially as the capacitor 38 charges exponentially to a value close to $$VR_g/(R_g + R_1)$$

A small voltage is developed across resistor 44 due to the bias requirements of the amplifier 28. A voltage $V_b = I_b R_2$ exists across the differential inputs 46 and 48 of the amplifier 28. This voltage can be adjusted by resistor 44 to retain enough voltage across the amplifier input to keep the amplifier output control signal 50 well below reference ground level and to adjust the sensitivity of the circuit. The amplifier output will remain constant as long as the input resistance from the ground resistance sensor 15 remains near a fixed value of resistance.

Capacitor 38 will charge to its full operating voltage, which, as noted above, is very close to $$VR_g/(R_g + R_1)$$

If a temporary relatively rapid decrease in the value of the ground resistance occurs to a value $R_{g'}$, such as by a man stepping on the sense electrode 14, the voltage at point 42 decreases exponentially toward a value of $$VR_{g'}/(R_{g'} + R_1)$$

The decrease in ground resistance causes the capacitor 38 to partially discharge during the period where the ground resistance $R_{g'}$ is effective. If the resistance change is of sufficient magnitude, the voltage developed across resistor 44 causes the amplifier output control signal 50 to swing positive above ground potential as the direction of current through resistor 44 changes. The capacitor 38 discharge continues until the capacitor has discharged to close to $$VR_{g'}/(R_{g'} + R_1)$$

or until the ground resistance returns to its original value $R_g$. As the current flow diminishes, the amplifier 28 reverts to a similar condition as before the disturbance. The amplifier 28 begins with its output control signal below ground at $-V_1$ and ends with its output control signal below ground at $-V_1$; the intermediate value is a positive value, $V_o$, and the output from the amplifier 28 is a pulse. The pulse width is a function of the positive battery 30 voltage; the values of $R_1$, $R_2$, $C$, $R_g$, $R_{g'}$; and the parameters of the amplifier 28. It can be seen that this circuit offers the advantage of automatic adjustment for different values of local ground resistance.

The output control signal 50 from the amplifier 28 passes resistor 51 to any suitable control switch, such as an SCR 52. When the positive control signal 50 is received, transistor 52 switches thereby completing the circuit to enable any suitable utilization means, such as the detonator 24 in the embodiment herein described.

Figure 5:
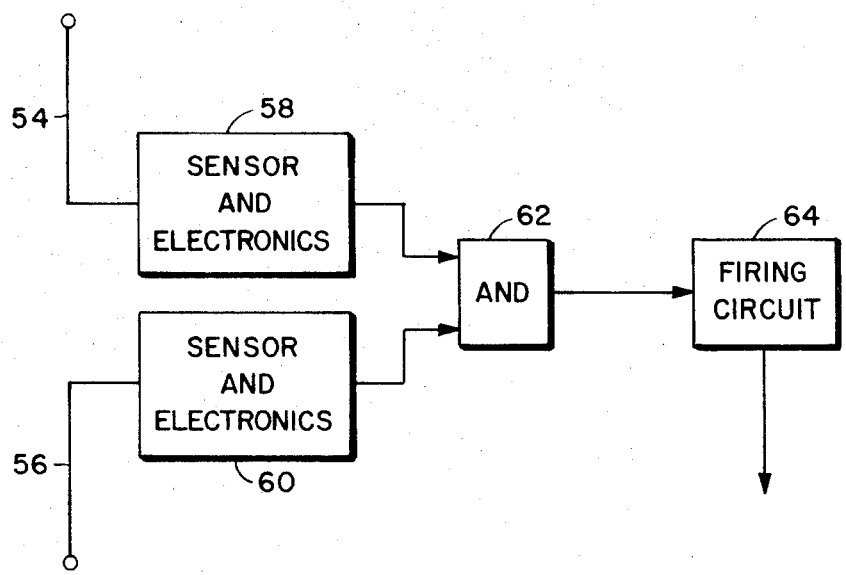
FIG. 5 is a block diagram illustrating another exemplary circuit using this invention.

By way of example and not limitation, the following specific elements have been used and successfully reduced to practice:

$R_1 = 1.5M$
$R_2 = 22K$
Resistor $51 = 68K$
$C = 0.1\ \mu f$
SCR $52 = 2N885$
Amplifier $28 = uA735$
Battery $= \pm 3$ volt In some instances, it is desirable to have the mine detonate only when two sense electrodes have been engaged simultaneously, as when a vehicle is straddling the mine. This is accomplished by utilizing two or more independently operating sensors with processing circuits as shown in block form in FIG. 5. Sense electrodes 54 and 56 are separated substantially by 180°. Separate resistance variation measurement circuits 58 and 60, similar to circuit 22 of FIGS. 3 and 4, are respectively associated with the sense electrodes 54 and 56. The outputs from each circuit 58 and 60 are transmitted to an AND gate 62. When the AND gate 62 receives two signals simultaneously, such as when the vehicle is passing over the sense electrodes 54 and 56, the gate 62 will provide a signal to enable the firing circuit 64 in a manner similar to that described hereinabove. The firing circuit 64 then activates the utilization means, in this instance the detonator of the mine. The embodiment of FIG. 5 exploits a unique aspect of the encounter geometry when an anti-vehicular type mine is desired. The mine will not normally detonate when a man walks or runs across a field of anti-vehicular mines.

It should be further noted that any number of sense electrodes may be utilized. In addition, the sensing electrodes 14 may comprise a wire strip or plate. The circuit 22 need only to provide the ability to detect a resistance change reliably. It may comprise a self-balancing bridge and open and closed loop amplifiers together with frequency compensation. The amplifier may be AC coupled and incorporate an automatic level control. The output circuit may incorporate a detonator, a radio transmitter or some form of visual indication.

It can be seen that this invention provides for the detecting of rapid variations in the resistance between a network of electrodes placed on the surface of the earth. The variations in ground resistance may be caused by any external force, such as a vehicle or a man, forcing an electrode to make better contact with the surface of the earth and, thereby, cause a decrease in the ground surface resistance. Accordingly, the objects of this invention hereinbefore set forth have been accomplished.

While present exemplary embodiments of this invention have been illustrated and described, it will be recognized that this invention may be otherwise variously embodied and practiced by those skilled in the art.

What is claimed is:

1. Apparatus for generating a control output signal in response to the disturbance of the electrical contact between a single conductor and terrain comprising:
   a first electrode comprising a single conductor having first condition established points of electrical contact between said conductor and the terrain to establish an initial contact impedance between said conductor and the terrain, a subsequent contact impedance being established when said conductor is urged into closer contact with the terrain in response to the disturbance;
   a second electrode having contact with the terrain and establishing a second contact impedance serially connected with the contact impedance established by said first named electrode, said first and second electrodes being positioned so that they are spaced from each other and electrically out of contact while the initial and subsequent contact impedances are established;
   circuit means being connected to the terrain through said first electrode with a return path provided by said second electrode, said circuit means being responsive to the change from the initial to the subsequent contact impedance between said first electrode and the terrain for generating said output control signal;
   means responsive to said circuit means responding to the change in contact impedance for deriving said control signal;
   and output means responsive to said control signal.

2. The apparatus as defined in claim 1 wherein said impedances are resistive.

3. The apparatus as defined in claim 2 wherein said circuit includes a source of direct current, a first resistor, a second resistor and a capacitor connected sequentially in series across said source, said conductor being connected to the junction of the first and second resistors, a second electrode connected to the junction between the current source and remaining capacitor terminal whereby said capacitor charges to an initial level when said conductor is in said first condition, and whereby said level changes when said subsequent impedance is established and wherein said control signal deriving means includes means responsive to said change in level for generating said control output signal in response to the signal across said second resistor.

4. The apparatus as defined in claim 2 in which said conductor is an elongated electrode.

5. The apparatus as defined in claim 4 in which said elongated electrode is a conducting wire.

6. The apparatus as defined in claim 5 further comprising a plurality of conducting wires each forming a separate single electrode.

7. The apparatus as defined in claim 3 in which said means responsive to said change in level includes a difference amplifier, said amplifier being connected with said conductor using said first and second input terminals,
   said source of direct current providing bias current to said amplifier and said conductor;
   switch means for connecting said source with said amplifier and said conductor wherein said amplifier generates a non-control signal in response to the initial impedance of said conductor in the first condition and wherein said amplifier generates a control output signal when the impedance of said conductor changes relatively rapidly from the initial condition to the second condition.

8. The apparatus as defined in claim 7 further comprising
   gate means connected between said amplifier and said output means and being responsive to said amplifier control output signal to thereby permit enabling of said output means.

9. The apparatus as defined in claim 7 in which said amplifier is an operational amplifier operated in the differential mode.

10. Apparatus for generating a control output signal in response to changes in the contact impedance of at least a single conductor in contact with terrain comprising:
    a plurality of electrodes contacting the terrain at remote locations for establishing an initial contact impedance and a second contact impedance in response to changes in the contact impedance of at least one of the single conductors, both said impedances having impedance values substantially greater than the impedance of a pair of contacting metal electrodes;
    processing circuitry connected with said plurality of electrodes to provide an input for said processing circuitry, said processing circuitry generating a control output signal in response to a change from the initial contact impedance to a second contact impedance; and
    means responsive to said control output signal.

11. Apparatus for generating a control signal in response to a change in contact between a single conductor and terrain comprising:

a sensor connected to said conductor for establishing an initial, substantial ohmic resistance from said conductor to the terrain, said sensor establishing a second substantial ohmic resistance from said conductor to the terrain when said sensor is disturbed, both said ohmic resistances being substantially greater than the resistance of a pair of contacting metal electrodes;

a resistance variation detection circuit connected with said sensor and responsive to the change from the initial ohmic resistance to the second ohmic resistance, said circuit generating a control output signal in response to said change in ohmic resistance, and means responsive to said control output signal.

-. Apparatus as set forth in claim 11 in which 12. sensor comprises an elongated conducting wire randomly engaging the surface of the terrain in a first condition; and a second electrode forming a low impedance electrical connection to the terrain.

13. Apparatus as set forth in claim 12 in which said second electrode is a conducting housing engaging the surface of the terrain.

14. Apparatus as set forth in claim 12 in which said resistance variation detection circuit comprises:

an operational amplifier operated in the differential mode, said amplifier having two input leads;

means connecting said amplifier input lead to said conducting wire and second electrode wherein a difference input signal responsive to the initial ohmic resistance to the terrain is provided to said amplifier; and a power source providing a bias current to said amplifier and said sensor.

15. Apparatus as set forth in claim 14 in which said means includes resistors and a capacitor connected in series with said power source, and in which said sensor is connected in parallel with said second resistor and capacitor and wherein said capacitor is connected between said second electrode and one of said amplifier input leads; and switch means for connecting said power means with said resistance variation detection circuit and said sensor.

16. Apparatus as set forth in claim 15 further comprising:

gate means responsive to said amplifier control output signal connected between said amplifier and said output means wherein said gate means permits activation of said output means in response to said control output signal.

17. Apparatus as set forth in claim 11 further comprising a second sensor establishing a second initial ohmic resistance sensor establishing a second ohmic resistance to the terrain when said second sensor is disturbed;

a second resistance variation detection circuit connected with said second ground sensor and responsive to the change in ohmic resistance of said second the terrain resistance sensor, said second circuit providing a second control output signal in response to said change in ohmic resistance; and an AND gate connected with said two resistance variation detection circuits, said AND gate providing a transmission of a control signal only when said two control output signals are received simultaneously at said gate.

18. Apparatus as set forth in claim 11 in which said sensor comprises a plurality of first conductors connected in parallel, each of said conductors randomly engaging the terrain in a first condition to establish the initial ohmic resistance; and a second conductor forming a terrain ground.

19. The apparatus of claim 1 wherein said output means comprises a mine detonator energized by said control signal.

20. The apparatus of claim 1 wherein the means for deriving said control signal includes means for responding only to sudden changes of contact impedance as occur in response to an object coming into contact with the conductor.

21. A method of detecting the passage of an object, such as a person or vehicle, across a region of terrain comprising the steps of placing a first electrode in electric contact with terrain in the region, said first electrode being placed and having a configuration so as to be urged into closer contact with the terrain when an object passes over it than prior to the object passing over it, placing a second electrode in electric contact with the terrain, said first and second electrodes being spaced from each other and being out of electric contact with each other prior to and when the object passes over the first electrode, whereby an impedance change of the terrain between the electrodes occurs in response to the object passing over the first electrode, and responding to said impedance change to derive a detection indicating signal.

22. Apparatus for deriving an indication of an object, such as a person or vehicle, passing across a region of terrain comprising a first electrode adapted to lie on and be in electrical contact with the terrain and adapted to be in a position and have a configuration so as to be responsive to the object passing over it, a second electrode adapted to be in electric contact with the terrain and spaced from the first electrode while the electrodes are in contact with the terrain so that the electrodes are out of electric contact while lying on the terrain, whereby an impedance is established through the terrain between the electrodes while the electrodes lie on the terrain, said impedance changing suddenly in response to the object passing over the first electrode in response to increased contact between the first electrode and the terrain, and means responsive only to sudden changes of the impedance, as occur in response to the object passing over the first electrode, for deriving a control output signal.

* * * * *